United States Patent Office 3,497,010
Patented Feb. 24, 1970

3,497,010
COUPLING SYSTEM FOR SAND CONSOLIDATION
Claude T. Copeland, Tulsa, Okla., assignor to The Dow Chemical Company, Midland, Mich., a corporation of Delaware
No Drawing. Filed May 27, 1968, Ser. No. 732,099
Int. Cl. E21b 33/13
U.S. Cl. 166—295                                6 Claims

ABSTRACT OF THE DISCLOSURE

Loose or incompetent oil sands are consolidated with hardenable phenol-aldehyde resins in conjunction with a sequentially introduced combination of amino coupling agents. In particular, the strength of sands consolidated with phenol-aldehyde resins is substantially improved by the stagewise introduction into the formation, in any order, of an aminosilane and a second organic amine consisting essentially of carbon, nitrogen, oxygen and hydrogen. Preferred are the aliphatic, alicyclic, aryl, alkylaryl and aralkyl hydrocarbon amines. The use of the named organic amine has been found to increase the strength achieved with a given resin system by as much as 100 percent or more.

---

The objects of sand consolidation are well known to the petroleum industry. Usually it is the purpose of sand consolidation to cohere loose sands adjacent a well bore hole. When fluids are to be produced through the consolidated sands, an overflush is employed subsequent to treatment with the resin system to assure permeability of the treated sand mass. Additonal permeability is achieved if the solvent dispersing medium for the resin is incompatible with the set resin.

Sometimes, it may be desirable to consolidate loose sand and simultaneously plug a formation to prevent the passage of undesired fluids. In such event, the use of an overflush, or such resin solvents as introduce porosity upon setting of the resin, is omitted from the treatment.

It is well known that consolidation treatments with hardenable phenol-aldehyde resin systems can be improved with the use of a coupling agent; the function of which is to promote the adherence of resin to sand particles. It is also known that certain amino functional organo silanes and a few specific organic amines will function as coupling agents. See for instance the teachings of U.S. Patents 3,282,338, 3,285,339 and 3,297,086.

It would be particularly desirable to provide an improved sand consolidating system based on phenol-aldehyde resins. Especially desirable is the provision of sand consolidating techniques which yield improved strength properties. Particular needs of the art are improved coupling systems for sand consolidation.

The foregoing, and other benefits as will become apparent hereinafter, are objects of the instant invention. Broadly, the instant invention involves modifying known sand consolidating techniques employing hardenable phenol-aldehyde resins. These systems are substantially improved by the stagewise introduction into the formation to be treated, in any order, of amino silane and a second organic amine.

As a first stage in the practice of sand consolidation the sand is conditioned to render it more amenable to treatment with the resin. Techniques to accomplish this are described in U.S. 3,097,692. Having preconditioned the sand, a hardenable phenol-aldehyde type resin system is introduced. A number of such systems are described in U.S. 2,476,015 and U.S. 2,490,291. Preferably, the resin system is partially reacted prior to introduction into the formation. In the preferred embodiment of the instant invention, the resin is introduced in the form of a mixture of two partially condensed systems which interact to produce a hard, strength imparting matrix.

Following introduction of the resin system, the treated formation is usually subjected to an overflush to restore permeability to the sands. Again, there are a number of optional variations in technique. One of these is described in U.S. 3,022,825 wherein the use of a phenolic additive to the overflush is described. The additive inhibits extraction of oil-soluble compounds from the resin mixture and enhances the strength achieved immediately adjacent the well bore.

According to the practice of the instant invention, an amino functional organo silane is utilized in one of the above stages of treatment. Such compounds and their manner of utilization are described in U.S. 3,285,339 and 3,297,087. At a different point in the sequence, either preceding or following application of the silane and within the same or different stages of treatment, a second organic amine is introduced into the formation. It has been discovered that the strength imparted by a given resin system is substantially and unexpectedly enhanced with the application of this second amine.

The second organic amine is characterized as a soluble organic amine consisting essentially of carbon, nitrogen, oxygen and hydrogen. The preferred amines are the aliphatic, alicyclic, aryl, alkylaryl and aralkyl hydrocarbon amines. Other permissible substituents include hydroxyl and carboxylate or carboxamide groups to the extent the presence of such moieties does not interfere with the compatibility and solubility of the amine in the dispersing medium. Oil-soluble amines that may be utilized in preflush or overflush liquids of hydrocarbon nature include various mono and polyfunctional amines in which the ratio of carbon atoms to each nitrogen is 5 or greater. Amines having lower ratios of carbon to nitrogen atoms become proportionately more soluble in polar solvents. They are employed with such emplacing liquids as alcohols, and alcohol ethers used in the preflush or resin emplacement stages.

The amount of each of the amino silane and second organic amine utilized in the practice of the invention will vary within the range from about 0.1 up to about 3 percent by volume based on the volume of resin mixture. Optimal properties will, of course, fall within narrower ranges depending upon the type of resin system employed and the particular stage of the treatment at which the amine is introduced into the formation.

In carrying out the invention, the amino silane and second amine are introduced stagewise into the formation in any order and at any point in the treatment. For example, the two amines are included in any two successive liquid injections, with or without intervening injections, employed in a given consolidation treatment. Alternately, the two amines can both be included in the same liquid injection. In one mode of operation, the amino silane is introduced with the preflush and an oil-soluble amine included with a second aliquot of a hydrocarbon preflush or in the hydrocarbon liquid utilized for the overflush. Another mode of operation involves introducing the amino silane with the resin system and the second amine in the overflush.

A preferred technique, however, is to introduce the amine silane in the preflush and the soluble amine with the resin. In the latter case, it is of course necessary that the soluble amine be sufficiently neutralized to avoid catalyzing the resin system. Although preferred practice is to introduce the amino silane first, the order of introduction can also be reversed to effectively achieved enhanced strength properties.

The following specific embodiments and examples further illustrate the unique effect achieved with the conjoint utilization of amino silanes and a second different amine as a coupling system in a phenol-aldehyde sand consolidation treatment.

EXAMPLE 1

A series of sand consolidation treatments utilizing an amino silane and a wide variety of second amines were evaluated for their effect on strength properties of the consolidated sands. The test involved a standard procedure in which a pipe mold was packed with a clean graded sand having a particle size within the range from about 70 to 200 mesh. The mold was equipped with inlet and outlet to allow for flushing liquids through the material contained within the mold.

Initially, a preflush was simulated by passing 4 volumes of diesel oil through the mold. The treatment was followed by one pore volume of a catalyzed phenol-aldehyde resin system. Before the resin cured, it was subjected to an overflush of about 2 pore volumes of diesel oil under a pressure approximately 25 pounds per square inch. The inlet and outlet valves were then turned off and the mold placed in a constant temperature bath. After 24 hours at a given temperature, which was chosen to simulate reservoir conditions, the consolidated sand core was removed from the mold and its compressive strength determined according to a standard method.

The particular resin employed in these evaluations was a combination of two partially condensed systems produced according to the following recipes: Resin A is prepared by partially condensing 780 pounds of phenol, 1012 pounds of aqueous (37% by weight) formaldehyde, and 100 pounds of 50 percent aqueous caustic. The mixture is held at about 175° F. for about 2.5 hours, allowing the phenol and formaldehyde to partially condense, i.e., to react together to a limited extent. The so-obtained reaction mass is then mixed with sufficient hydrochloric acid to lower the pH value to between about 4 and 6. This usually requires about 12.8 gallons of about 32 percent by weight, or the equivalent, of aqueous hydrochloric acid solution. As the acid is added, the mixture separates into two phases which are allowed to stratify. The upper layer constituting about 38 percent of the total volume is largely salt water and, after allowing the reaction mass to cool to room temperature, it is discarded. The lower layer comprises a slightly acid, partially condensed, aqueous phenol-formaldehyde liquid resin. It has a viscosity of between about 150 and 400 centipoises (cps.), a pH value of between 4.8 and 5.2 and a density of about 10 pounds per gallon. This liquid is stable for long periods of time but is capable of hardening when suitably catalyzed. To this liquid resin is added 820 pounds of resorcinol and 315 gallons of ethyl alcohol with mixing until dissolved.

Resin B is prepared as a soluble partial condensation of 1085 pounds of cresylic acid, 904 pounds of paraformaldehyde and 32 pounds of 50 percent aqueous sodium hydroxide. The mixture is heated to a temperature of 125° F. and maintained at this temperature until the mixture becomes clear. This clarification usually takes place in about 30 minutes. To the product so-obtained is added 4.1 gallons of about 32 percent hydrochloric acid solution. The addition of the acid brings about the formation of two liquid phases which are allowed to stratify into two layers. The upper layer is largely water and is discarded. After discarding the upper layer, the remaining lower layer is heated to about 175° F. for A thermosettable resin formulation was prepared from the foregoing Resins A and B by adding varying amounts from about 1 to 1.5 hours, so as to bring the viscosity to about 200 cps. measured at 80° F. The resulting liquid plastic resin has a pH between about 3.7 and 4.3 and a density of about 9.5 pounds per gallon. The total amount obtained is about 205 gallons. To this liquid resin is added 309 gallons of ethyl alcohol with mixing.

of 25 percent by weight aqueous sodium hydroxide as a catalyst to 1 part by volume of Resin A. After sufficient mixing to obtain a uniform dispersion of the catalyst, 1 part by volume of Resin B was added to the aliquot of Resin A with further mixing. If used with the resin, an amine coupling agent was then incorporated with additional mixing.

The three basic stages of the treatment were carried out in the following manner. Four pore volumes of diesel oil were passed through the sand as a preflush. As stage two of the treatment, the resin was introduced as a mixture of Resin A and Resin B. Into the resin system was incorporated 1 percent by volume, based on the total system, of a commercial amino silane characterized as a gamma-aminopropyl triethoxy silane. After introducing the resin, the third stage of the treatment comprised an overflush consisting of a one pore volume aliquot of diesel oil containing one-half percent of a soluble amine additive and a second one pore volume aliquot of diesel oil containing 1 percent by volume of the same additive. The resin was then cured at 150° F. for 24 hours.

The following Table I reports the second amine additive, as well as the average compressive strength of the consolidated sand for at least five specimens. The first run reported is a blank in which the amine additive was omitted from the overflush.

TABLE I

| Second amine overflush additive: | Compressive strength (p.s.i.), average |
|---|---|
| Blank | 1074 |
| Beta-nonylamine | 1580 |
| Triethylenetetramine | 1414 |
| Aniline | 1412 |
| $N^1,N^3$-bis(1-ethyl-3-methylpentyl)-diethylenetriamine | 1384 |
| N,N-dimethylaniline | 1367 |
| N,N-dimethylcyclohexylamine | 1345 |
| N-(2-hydroxyethyl) cyclohexylamine | 1344 |
| Gamma-aminopropyltriethoxysilane (A-1100) | 1292 |
| Di-isobutylamine | 1278 |
| Beta-heptylamine | 1237 |
| Cyclohexylamine | 1225 |
| Diethylenetriamine | 1195 |
| $N$-$N^1$-bis (1-methylheptyl)-ethylenediamine | 1152 |
| 2-ethyl hexylamine | 1121 |

Tests conducted in a manner similar to that above have demonstrated the utility of diamylamine, dicyclohexylamine, 1-ethyl-3-methylpentylamine, hexylamine, and higher alkyl quaternary ammonium compounds such as trimethylundecyl quaternary ammonium chloride to enhance the strength properties of consolidated sand when employed in conjunction with the amino silanes. In a preferred embodiment of the invention, the silane is introduced with the preflush or in the overflush and the second amine is introduced with the resin system. Amines especially preferred with this technique are dimethylaminomethylphenol and its acid salts, hexamethylenetetramine, and higher alkyl quaternaries such as didodecyldimethyl quaternary ammonium chloride and dodecyltetradecyl dimethyl ammonium chloride.

Of the amino silanes, gamma-aminopropyl triethoxy silane is preferred. Others that can be employed include:

2,aminoethyl-aminopropyl-trimethoxy silane;
2,aminoethyl-aminopropyl-tripropylene oxide silane;
2,aminoethyl-aminopropyl-triethylene oxide silane;
2,aminoethyl-aminopropyl-trimethoxy silane;
2,amino propyl-aminopropyl-trimethoxy silane;
1,trimethoxy-2,aminoethyl-2,aminopropyl disilane;
1,triethyleneoxide-2,aminoethyl-2,aminopropyl disilane;
1,tripropylene oxide 2,aminoethyl-2,aminopropyl disilane;
1,trimethoxy-2,aminomethyl-2,aminopropyl disilane;
1,trimethoxy-2,aminopropyl-2,aminopropyl disilane; and
1,trimethoxy-2,aminoethyl-2,aminoethyl disilane.

METHOD EXAMPLES

Numerous examples of introducing a combination of amino silanes and a second organic amine were evaluated. The method of evaluation and resins described in the above example were employed in these tests. A number of such tests were successfully conducted, i.e., the combination yielded higher strength than the use of the amino silanes alone, and these tests are set forth in Runs 1 through 8 in the following table. Runs 9 through 16 are further illustrations of variety in modes of operation.

TABLE II

| | Preflush (Stage 1) | | | Plastic (Stage 2) | Overflush | |
|---|---|---|---|---|---|---|
| Run | First Fraction | 2nd Fraction | 3rd Fraction | 1st Fraction | 1st Fraction | 2nd Fraction |
| 1 | H | H+I+AS | H | P + AMP | H | H |
| 2 | H | H+I+AS | H | P | H + OSA | H + OSA |
| 3 | H | | | P + AS | H + OSA | H + OSA |
| 4 | H | | | P | H + OSA | H + AS |
| 5 | H | | | P | H + AS | H + OSA |
| 6 | H | | | P + AMP | H | H + AS |
| 7 | H | | | P + AMP | H + OSA | H + AS |
| 8 | H + OSA | | | P | H | H + AS |
| 9 | H | H+I+AS | H | P + PSA | H | H |
| 10 | H | H+I+AS | H | P + AMP + PSA | H | H |
| 11 | H | | | P + PSA + AS | H | H |
| 12 | H | | | P + AMP + AS | H | H |
| 13 | H | | | P + PSA + AMP + AS | H | H |
| 14 | H + OSA | | | P + AS | H | H |
| 15 | H + OSA | | | P + AMP + AS | H | H |
| 16 | H + OSA | | | P + AMP | H | H + AS |

H = Hydrocarbon liquid.
I = Isopropyl alcohol.
P = Plastic.
AS = Amino silane.
AMP = Amino phenol.
PSA = Plastic soluble aliphatic hydrocarbon amine.
OSA = Oil soluble aliphatic hydrocarbon amine.

What is claimed is:

1. In a method for consolidating incompetent petroliferous soils which comprises sequentially introducing into the soil to be treated (1) a conditioning preflush to render the soil amenable to wetting by the resin, (2) a partially reacted hardenable phenol-aldehyde resin containing a catalytic amount of an alkali metal hydroxide, and (3) an overflush to restore permeability to the treated zone, the improvement which comprises introducing stagewise, in any order, an amine functional silane and a soluble organic amine dissolved in a fluid, said amine being characterized as consisting essentially of carbon, nitrogen, oxygen and hydrogen.

2. A method as in claim 1 wherein the amino functional silane is introduced into stages one or two and is followed in the subsequent stage by introduction of the soluble amine.

3. A method as in claim 2 wherein the overflush is a liquid hydrocarbon and contains the soluble amine.

4. A method as in claim 1 wherein the amino functional silane is an amino alkyl trialkoxy silane and the soluble amine is an oil-soluble hydrocarbon amine having from 5 to 30 carbon atoms.

5. A method as in claim 1 wherein the amount of each of the amino functional silane and soluble amine is within the range from about 0.1 to about 3.0 percent by volume based on the volume of resin.

6. A method as in claim 1 wherein the phenol-aldehyde is a partial condensation product of phenol and formaldehyde.

References Cited

UNITED STATES PATENTS

| | | | |
|---|---|---|---|
| 3,052,583 | 9/1962 | Carlström et al. | |
| 3,282,338 | 11/1966 | Walther et al. | 166—33 |
| 3,297,086 | 1/1967 | Spain | 166—33 |
| 3,297,087 | 1/1967 | Spain | 166—33 |
| 3,310,111 | 3/1967 | Pavlich et al. | 166—33 |
| 3,419,072 | 12/1968 | Maly et al. | 166—33 |

CHARLES E. O'CONNELL, Primary Examiner

IAN A. CALVERT, Assistant Examiner

PO-1050
(5/69)

UNITED STATES PATENT OFFICE
CERTIFICATE OF CORRECTION

Patent No. 3,497,010      Dated February 24, 1970

Inventor(s) Claude T. Copeland

It is certified that error appears in the above-identified patent and that said Letters Patent are hereby corrected as shown below:

Column 3, lines 70 through 75 should be inserted after line 67.

SIGNED AND
SEALED
NOV 3 1970

(SEAL)
Attest:

Edward M. Fletcher, Jr.
Attesting Officer

WILLIAM E. SCHUYLER, JR.
Commissioner of Patents